United States Patent

Song et al.

[11] Patent Number: 5,991,531
[45] Date of Patent: Nov. 23, 1999

[54] SCALABLE WIDTH VECTOR PROCESSOR ARCHITECTURE FOR EFFICIENT EMULATION

[75] Inventors: Seungyoon Peter Song, Los Altos; Heonchul Park, Cupertino, both of Calif.

[73] Assignee: Samsung Electronics Co., Ltd., Seoul, Rep. of Korea

[21] Appl. No.: 08/804,765

[22] Filed: Feb. 24, 1997

[51] Int. Cl.$^6$ .................................................. G06F 9/455
[52] U.S. Cl. ................. 395/500.47; 395/500.44
[58] Field of Search ............................................. 395/500

[56] References Cited

U.S. PATENT DOCUMENTS

| | | | |
|---|---|---|---|
| 4,760,545 | 7/1988 | Inagami et al. | 364/200 |
| 5,001,626 | 3/1991 | Kashiyama et al. | 364/200 |
| 5,404,489 | 4/1995 | Woods et al. | 395/425 |
| 5,553,010 | 9/1996 | Tanihira et al. | 364/715.08 |
| 5,701,508 | 12/1997 | Glew et al. | 395/800 |
| 5,761,348 | 6/1998 | Honma | 382/305 |

OTHER PUBLICATIONS

Ngai et al., High performance parallel vector processor–decreases time required to process pair of vectors stored in two registers, Derwint, p. 1–4, Sep. 9, 1983.

Primary Examiner—Kevin J. Teska
Assistant Examiner—Samuel Broda
Attorney, Agent, or Firm—Skjerven, Morrill, MacPherson, Franklin & Friel LLP; Tom Chen

[57] ABSTRACT

A N-byte vector processor is provided which can emulate 2N-byte processor operations by executing two N-byte operations sequentially. By using N-byte architecture to process 2N-byte wide data, chip size and costs are reduced. One embodiment allows 64-byte operations to be implemented with a 32-byte vector processor by executing a 32-byte instruction on the first 32-bytes of data and then executing a 32-byte instruction on the second 32-bytes of data. Registers and instructions for 64-byte operation are emulated using two 32-byte registers and instructions, respectively, with some instructions requiring modification to accommodate 64-byte operations between adjacent elements, operations requiring specific element locations, operations shifting elements in and out of registers, and operations specifying addresses exceeding 32 bytes.

13 Claims, 6 Drawing Sheets

FIG. 7

SCALABLE WIDTH VECTOR PROCESSOR ARCHITECTURE FOR EFFICIENT EMULATION

BACKGROUND OF THE INVENTION

1. Field of the Invention

This invention relates generally to data processors, and more particularly to improved architecture of data processors for reducing costs, size, and code density.

2. Description of Related Art

Microprocessors are designed to handle specific data widths. For example, a vector processor designed for parallel processing of 32 8-bit data elements uses 256-bit wide vector registers and execution units having 32-byte data paths. Vector processor instructions may specify a location of any of 32 elements within a vector register and a type of operation to be performed on the specified elements. Because the register sizes, execution unit architecture, and instruction syntax are adapted to operate on vectors of a specific size, such architectures are generally unable to accommodate larger size data widths.

Therefore, as newer microprocessors are designed for larger data widths to increase processing power, smaller data width architectures are unable to support these larger data operations. Consequently, the new designs provide larger registers and new instructions to specify data element locations and operation types. For example, 512-bit wide registers and instructions capable of specifying up to 64 element locations are needed to process 64 bytes of data. In order to process larger data widths, the size and cost of the microprocessor increases because of the need to increase chip size and to develop and manufacture new vector processor circuits.

Minimizing costs and chip area are important goals in microprocessor design. Therefore, a vector processor capable of processing larger data widths without a proportional increase in chip size, cost, and code length is desired. Specifically, an vector processor capable of emulating larger data width operations with existing architecture designed for smaller data width operations is desired.

SUMMARY

A vector processor architecture permits emulation of double-width operations that manipulate vectors twice as wide as the vector processor's data path. For example, a 2N-byte microprocessor operation is emulated using two N-byte operations in an N-byte wide vector processor architecture. An exemplary embodiment of the invention uses a 32-byte vector processor to perform or emulate 64-byte operations.

Architecture for a 32-byte vector processor of the exemplary embodiment implements a set of instructions that read, modify and write vector data registers, and includes an instruction fetch unit, an instruction decoder, a state machine emulator (including an instruction issuer) to copy and modify 32-byte instructions, a register file containing 32-byte (256-bit) general purpose vector registers capable of holding multiple data elements of various data types and 32-bit general purpose scalar registers, an execution unit, two 512-bit double precision accumulator registers, and 32-bit special purpose scalar registers. Each 32-byte register can be paired with a second 32-byte register to act as one 64-byte register. Similarly, the two double-precision 64-byte accumulator registers can combine as one double-precision 128-byte accumulator. Furthermore, each 32-bit special purpose register that uses one bit to specify a byte or element position in a 32-byte vector register can be paired with another 32-bit special purpose register to specify data element locations 0 to 63.

A 64-byte operation can be then implemented by executing two sequential 32-byte operations. A mode bit indicates to the 32-byte vector processor whether a 32-byte operation or a 64-byte operation is to be performed. If 64-byte mode is selected, an emulator modifies the 32-byte instruction from a fetch unit and instruction decoder into two 32-byte instructions, and then sequentially transfers each 32-byte instruction to a register file and execution unit for processing. If 32-byte mode is selected, the emulator does not modify the instruction.

Most instructions are independent of data width and are not modified. However, instructions that specify element location and/or operate on elements within a vector register can be defined or modified for 64-byte emulation. Instructions that specify element location require six bits to designate element locations 0 through 63, while only five bits are needed to specify locations 0 through 31 for 32-byte operation. Consequently, an extra sixth bit, unused for 32-byte operations, is used in the instruction field to specify up to 64 elements. 64-byte instructions which are symmetrical about the vector middle can b split into two 32-byte instructions, where the second 32-byte instruction includes an appended bit to indicate operation on the second 32-bytes of data. Other 64-byte instructions that operate on adjacent elements are defined to operate on odd/even and even/odd pairs so that the first 32-byte instruction is executed on data in the first 32-byte register (bytes 0–31). The second 32-byte instruction then operates on even/odd and odd/even data pairs in the second32-byte register (bytes 32–63) to provide a 64-byte result. Still other 64-byte instructions shift elements in and out of registers. These instructions use a scalar register twice, once to hold the temporary result of a first 32-byte shift and second to hold the final result of a second 32-byte shift, to emulate a 64-byte operation. Other instructions which load or store data to registers require that the effective address of the second 32-byte instruction be adjusted by 32 bytes.

Therefore, 64-byte operations can be emulated using two sequential 32-byte operations and a 32-byte architecture, resulting in reduced chip size, costs, and code length.

BRIEF DESCRIPTION OF THE DRAWINGS

Use of the same reference symbols in different figures indicates similar or identical items.

DETAILED DESCRIPTION OF THE PREFERRED EMBODIMENTS

In an exemplary embodiment of the present invention, a vector processor architecture permits emulation of an instruction set having 64-byte wide operations with 32-byte wide operations and data paths, thereby allowing 64-byte wide procedures to run on smaller and less costly existing 32-byte wide architectures. However, the description of the 32-byte vector processor is not meant to be limiting, but merely to illustrate the principles of the present invention. Similar principles can be applied to emulate 2N-byte wide (or any double width) operations with N-byte (or other single width) architectures.

Figure 1:
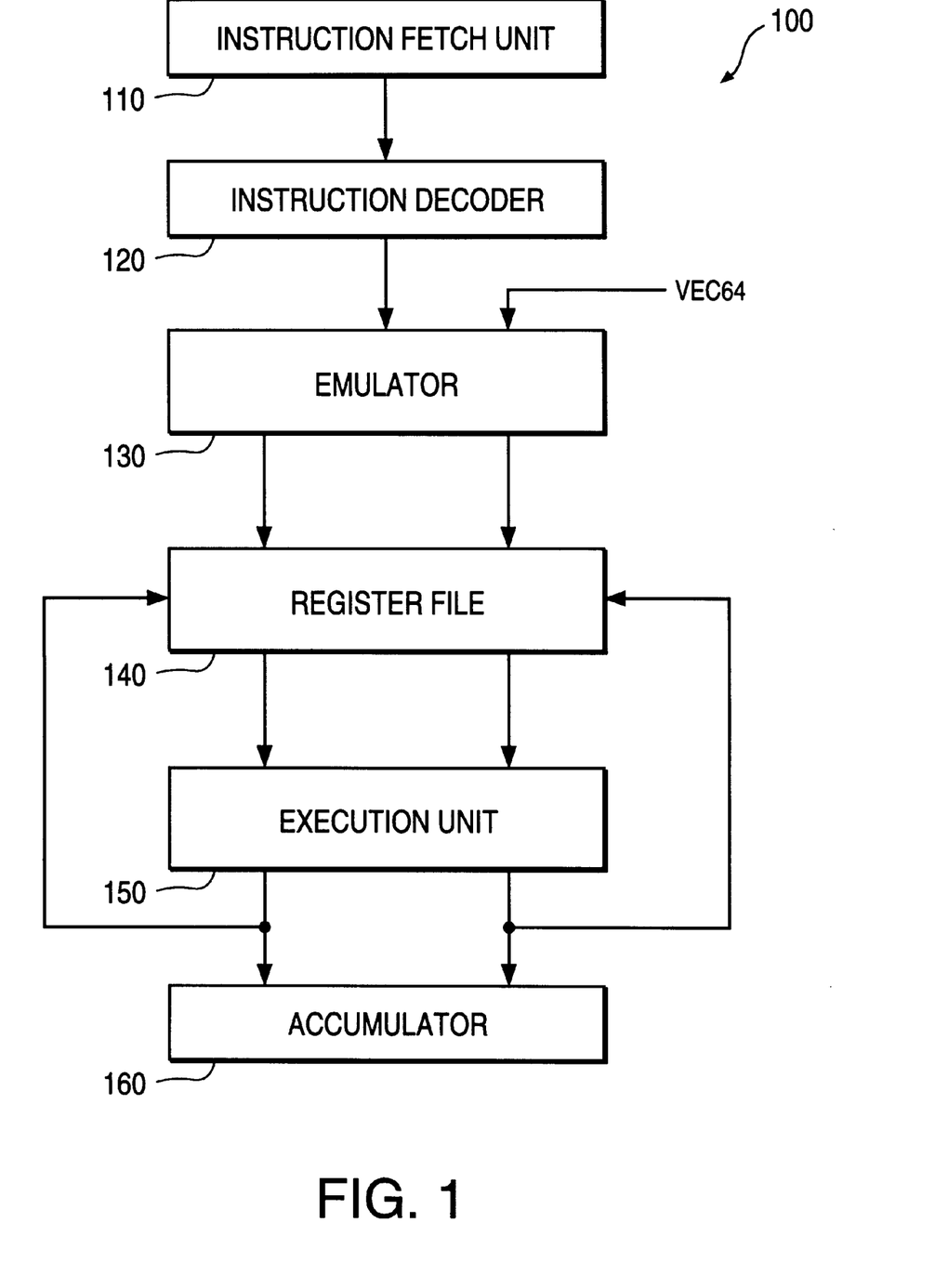
FIG. 1 is a block diagram of a vector processor of the present invention.

FIG. 1 shows the primary functional blocks of the exemplary embodiment of a scalable width vector processor 100. Vector processor 100 includes an instruction fetch unit (IFU) 110, an instruction decoder 120, an emulator state machine 130 (which includes an instruction issuer (not shown)), a register file 140, an execution data path 150, and an accumulator 160. Co-owned U.S. app. Ser. No. 08/699,597, entitled "SINGLE-INSTRUCTION-MULTIPLE-DATA PROCESSING IN A MULTIMEDIA SIGNAL PROCESSOR", describes an exemplary vector processor without emulator state machine 130 and is incorporated by reference herein in its entirety.

In FIG. 1, IFU 110 fetches instructions from an instruction memory (not shown), which are then decoded in instruction decoder 120. In general, instructions indicate source and destination registers, an operation type, and a data type. Depending on a mode bit VEC64, emulator 130 then either passes the instructions from decoder 120 to register file 140 and execution unit 150 for execution or modifies the instructions. If 32-byte mode is selected, the unmodified instruction selects the desired register and elements in register file 140. Execution unit 150 executes logic/arithmetic operations on the data, which can then be stored back into register file 140 or stored in a double-precision accumulator 160 for additional processing.

However, if a 64-byte mode is selected, emulator 130 creates a 64-byte instruction with two 32-byte instructions and modifies the 32-byte instructions, if necessary, to select and operate on data from a first and second set of 32-byte registers in register file 140. An instruction issuer in emulator 130 issues the first 32-byte instruction to register file 140 and execution unit 150 for processing the first 32-bytes of data. Sequentially, the issuer issues the second 32-byte instruction into the instruction pipeline, which allows the second 32-bytes of data to be processed immediately after the first 32-bytes of data. A suitable instruction issuer for the exemplary vector processor is described in co-owned U.S. app. No. UNKNOWN, entitled "INSTRUCTION SCHEDULING USING SINGLE-CYCLE MICRO-INSTRUCTIONS", attorney docket No. M-4678, filed on Jan. 28, 1997, and is incorporated by reference herein in its entirety. After execution unit 150 processes the first 32-bytes of data, the result is transferred back to the first set of registers or an accumulator 160. Similarly, the result of the second 32-bytes of data is transferred back to the second set of registers or to accumulator 160. Consequently, a 64-byte operation is emulated with two sequential 32-byte operations.

The registers of vector processor 100 in the exemplary embodiment for 32-byte operations include 32 32-bit scalar registers, 64 256-bit general purpose vector registers, 33 32-bit special purpose registers, and two double-size (512-bit) accumulator registers. The 33 special purpose registers cannot be loaded directly from memory or stored directly to memory. Sixteen special purpose registers, referred to as RASR0 to RASR15, form an internal return address stack and are used by the subroutine call and return instructions. The other seventeen 32-bit special purpose registers are shown in Table A.1 in Part A of the section at the end of the specification entitled "Additional Vector Processor Information".

Figure 2:
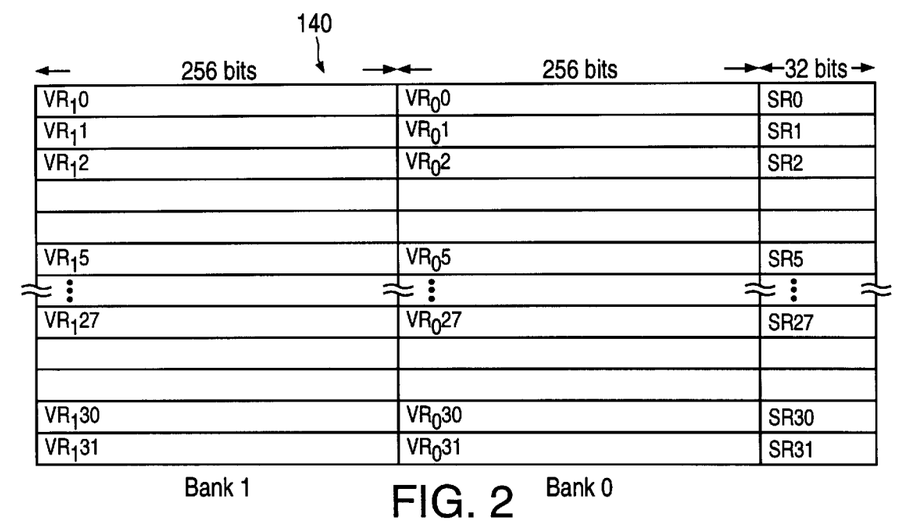
FIG. 2 is a diagram of contents of a register file of FIG. 1.

FIG. 2 shows contents of register file 140 consisting of 32 32-bit scalar registers (SR0 to SR31) and 64 256-bit vector registers. Scalar registers are 32 bits wide and can contain one data element of any one of the defined sizes (8-bit, 16-bit or 32-bit). The 8-bit and 16-bit data types are stored in the least significant bits of the scalar registers, with the most significant bits having undefined values. The scalar registers are identified by 5-bit register numbers ranging from 0 to 31.

The 256-bit vector registers support multiple data types as well as multiple elements, as shown below.

| Data Type | Element Length (bits) | Max Number of Elements | Total Number of Bits Used |
|---|---|---|---|
| Byte | 8 | 32 | 256 |
| Halfword | 16 | 16 | 256 |
| Word | 32 | 8 | 256 |

The 64 vector registers are organized into 2 banks, each with 32 registers. BankO contains the first 32 registers ($VR_0 0$ to $VR_0 31$) and bank1 contains the second 32 registers ($VR_1 0$ to $VR_1 31$). In 32-byte operations, the two banks are used in a manner where one bank is set as the current bank and the other is set as the alternate bank. All vector instructions use the registers in the current bank by default, except the load/store and register move instructions which can access vector registers in the alternate bank. The vector registers can be identified by a one-bit bank number (0 or 1) and a 5-bit vector register number ranging from 0 to 31. The set of vector instructions for the exemplary embodiment are given in Table B.1 in Part B of the "Additional Vector Processor Information" section. The CBANK bit in the special purpose Vector Control and Status Register (VCSR) is used to set bank0 or bank1 to be the current bank, with the other bank becoming the alternate bank. Table A.2 in Part A of the "Additional Vector Processor Information" section shows specific bit functions within VSCR.

A pair of 32-byte vector registers having the same register number can be combined to provide a double-size vector registers of 512 bits (or 64 bytes) for 64-byte operation, i.e., $$VRi<511:0>=VR_1 i<255:0>:VR_0 i<255:0>,$$

where $VR_0 i$ and $VR_1 i$ denote the vector registers having register number VRi in bank1 and in bank0, respectively. In equivalent byte or element notation, $$VRi[63:0]=VR_1 i[31:0]:VR_0 i[31:0].$$

The double-size vector registers are referenced as VR0 through VR31. Thus, the two 32-byte registers corresponding to bank0 and bank1 can be addressed as one 64-byte register. The VEC64 bit in control register VCSR identifies whether the vector processor operates on 32-byte or 64-byte data widths. Setting bit VEC64 to 1 in the status register places the vector processor in mode VEC64 where double-size (512-bit) is the default size of the vector registers. In the VEC64 mode, there are no current and alternate banks, and a vector register number denotes a corresponding pair of 256-bit vector registers from the two banks.

Some special purpose registers have bits that correspond to specific data element locations in a vector register. In these cases, each bit in a 32-bit special register is associated with one element. Because a 64-byte (512-bit) vector register can have at most 64 8-bit elements, a second 32-bit special purpose register is needed to specify the additional 32 elements for 64-byte operations. Three types of special purpose registers require a second register. Theses are identified in Table A.1 as global mask registers VGMR0 and VGMR1, move mask registers VMMR0 and VMMR1, and overflow registers VOR0 and VOR1. Registers VGMR0 and VGMR1 can be set by comparing a vector register with a vector or scalar register or with an immediate value using the VCMPV instruction. This instruction properly sets the mask according to the specified data size. The scalar registers are limited to only one data element, and scalar operations (i.e., operations where the destination registers are scalar) are not affected by the element mask.

To provide flexibility in vector programming, most vector instructions use an element mask to operate only on the selected elements within a vector. The Vector Global Mask Registers VGMR0 and VGMR1 identify the elements that are modified in the destination register and the vector accumulator by the vector instructions. Vector Global Mask Register VGMR0 indicates the elements of the destination vector register VRd that are to be affected in the VEC32 mode and the elements within VRd<255:0> in the VEC64 mode. Each bit in VGMR0 controls the update of 8 bits in the vector destination register. Specifically, register VGMR0<i> controls the update of VRd<8i+7:8i> in the VEC32 mode and of $VR_0d$<8i+7:8i> in the VEC64 mode, where <i> is the ith element in the register. Note that $VR_0d$ denotes the destination register in bank0 in the VEC64 mode and that VRd refers to the destination register in the current bank, which can either be the bank 0 or bank 1 in the VEC32 mode. Vector global mask register VGMR0 is used in execution of all instructions except the VCMOVM instruction.

Vector Global Mask Register VGMR1 indicates the elements within VRd<511:256> that are affected in the VEC64 mode. Each bit in register VGMR1 controls the update of 8 bits in the vector destination register in bank1. Specifically, VGMR1<i> controls the update of $VR_1d$<8i+7:8i>. Register VGMR1 is not used in the VEC32 mode but, in VEC64 mode, affects execution in all instructions except the VCMOVM instruction.

For 8-bit data type operations, each of the 32 bits in VGMR0 (or VGMR1) identifies an element to be operated on. Setting bit VGMR0<i> indicates that the element i of the vector register is to be affected, i being 0 to 31. For 16-bit data type operations, each pair of the 32 bits in VGMR0 (or VGMR1) identifies an element to be operated on. Setting bits VGMR0<2i:2i+1> indicates that element i is to be affected, i being 0 to 15. If only one bit of a pair in VGMR0 is set for 16-bit data type operation, only the bits in the corresponding byte are modified. For 32-bit data type operations, each set of four bits in VGMR0 (or VGMR1) identifies an element to be operated on. Setting bits VGMR0<4i:4i+3> indicates that the element i is to be affected, i being 0 to 7. If not all bits in a set of four in VGMR0 are set for a 32-bit data type operation, only the bits in the corresponding byte are modified.

Vector Overflow Register VOR0 indicates the elements in the VEC32 mode and the elements within VR<255:0> in the VEC64 mode that contains overflow results after a vector arithmetic operation. This register is not modified by a scalar arithmetic operation. Bit VOR0<i> being set indicates that the ith element of the 8-bit data type, the (i div 2)th element of the 16-bit data type, or the (i idiv4)th element of the 32-bit data type operation contains an overflow result, where idiv is integer division. For instance, bit 1 and bit 3 would be set to indicate overflow of the first 16-bit and 32-bit element (element in location 0), respectively. This mapping of bits in VOR0 is different from the mapping of the bits in VGMR0 or VGMR1.

Vector Overflow Register VOR1 indicates the elements within VR<511:256> in the VEC64 mode that contain overflow results after a vector arithmetic operation. Register VOR1 is not used in the VEC32 mode nor modified by a scalar arithmetic operation. Bit VOR1<i> being set indicates that the ith element of the 8-bit data type, the (i div 2)th element of the 16-bit data type, or the (i idiv 4)th element of the 32-bit data type operation contains an overflow result. For instance, bit 1 and bit 3 would be set to indicate overflow of the first 16-bit and first 32-bit element, respectively in VR<511:256>. The mapping of bits in VOR1 is different from the mapping of the bits in VGMR0 or VGMR1.

The VCMOVM instruction uses Vector Move Mask Register VMMR0 at all times as well as when VCSR<SMM>=1 for all instructions. Register VMMR0 indicates the elements of the destination vector register that are to be affected in the VEC32 mode and the elements within VR<255:0> in the VEC64 mode. Each bit in VMMR0 controls the update of 8 bits in the vector destination register. Specifically, VMMR0<i> controls the update of VRd<8i+7:8i> in the VEC32 mode and of $VR_0d$<8i+7:8i> in the VEC64 mode. $VR_0d$ denotes the destination register in bank0 in the VEC64 mode and VRd refers to the destination register in the current bank, which can either be bank0 or bank1 in the VEC32 mode.

Vector Move Mask Register VMMR1 is used by the VCMOVM instruction at all times as well as when VCSR<SMM>=1 for all instructions. Register VMMR1 indicates the elements within VR<511:256> that are to be affected in the VEC64 mode. Each bit in VMMR1 controls the update of 8 bits in the vector destination register in bank1. Specifically, VGMR1<i> controls the update of VR1d<8i+7:8i>. Register VGMR1 is not used in the VEC32 mode.

Referring back to FIG. 1, accumulator 160, containing two 512-bit registers, can be configured or accessed in similar manner as the vector registers. The vector accumulator registers provide storage for intermediate results that have higher precision than the results in destination registers. The vector accumulator registers include four 256-bit registers, designated VAC1H, VAC1L, VAC0H and VAC0L. VAC0H and VAC0L are combined to yield $$VAC0<511:0>=VAC0H<255:0>:VAC0L<255:0>$$

and is used by default in 32-byte mode. VAC1H and VAC1L are combined in the VEC64 or 64-byte mode to yield $$VAC1<511:0>=VAC1H<511:256>:VAC1L<255:0>$$

for emulation of 64-byte vector operations. Thus, register VAC0<511:0> and VAC1<511:0> are combined to create a 1024-bit double precision register $$VAC<1023:0>=VAC1<511:0>:VAC0<511:0>.$$

VAC1 is only used for the 64-byte mode. Even when bank1 is set to be the current bank in VEC32 mode, VAC0 is used.

To produce an extended precision result with the same number of elements as in the source vector registers, extended precision elements are saved across a pair of registers, as shown below, with i being the ith element and <n> indicating the data size.

| Element Size | Logical View | VAC Format |
| --- | --- | --- |
| 8-bit | VAC[i]<15:0> | VAC0H[i]<7:0>: VAC0L[i]<7:0> for i = 0 . . . 31 and VAC1H[i − 32]<7:0>: VAC1L[i − 32]<7:0> for i = 32 . . . 63 |
| 16-bit | VAC[i]<31:0> | VAC0H[i]<15:0>: VAC0L[i]<15:0> for i = 0 . . . 15 and VAC1H[i − 16]<15:0>: VAC1L[i − 16] for i = 16 . . . 31 |
| 32-bit | VAC[i]<63:0> | VAC0H[i]<31:0>: VAC0L[i]<31:0> for i = 0 . . . 7 and VAC1H[i − 8]<31:0>: VAC1L[i − 8]<31:0> for i − 8 . . . 15 |

In addition to modifying vector processor registers, certain instructions are modified or defined so that a 32-byte vector processor can also operate on 64-byte data widths. As mentioned earlier, Table B.1 lists instruction set for the vector processor in the exemplary embodiment. For vector processor 100, each instruction is 32 bits long and has one of the nine formats shown in FIG. 3, labeled REAR, REAI, RRRM5, RRR, RI, CT, RRRM9, RRRM9$^+$, and RRRM9$^{++}$. Descriptions of the nine formats and the fields within the format are provided in Part C of the "Additional Vector Processor Information" section. Part D of the section illustrates the instruction encoding in the various formats for the instructions in Table B.1.

Vector processor instructions that specify operands independent of vector processor widths do not need to be modified for 64-byte operations. These instructions specify data type (8-bit, 16-bit or 32-bit) and operations which are performed on elements from the same location of two vector registers or operands. Specific locations do not need to be specified, and therefore emulator 130 simply makes a copy of the 32-byte instruction for operation on the second 32-bytes of data. Most of the instructions in Table B.1 for the exemplary embodiment of the present invention are specified independent of the vector register width, and thus do not need to be modified by emulator 130 of FIG. 1. However, some instructions require specifying element locations and/or require operations on adjacent elements. In these cases, emulator 130 modifies the instruction for 64-byte operation.

Figure 4A:
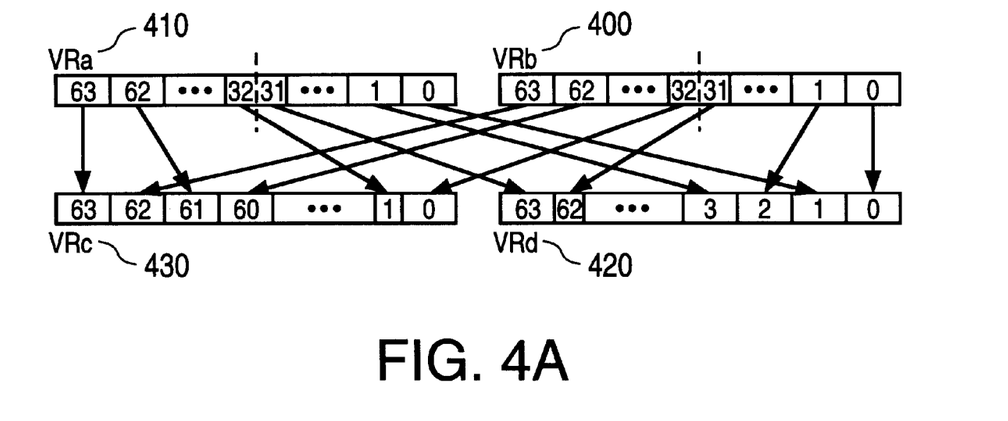
FIG. 4A is a diagram of a 64-byte shuffle operation.

Instructions that move one element from one position to another position without the need to designate a specific position such that the instructions are symmetric with respect to upper and lower halves of a double-width vector register are simply split into two single-width operations which emulate a double-width operation. In the exemplary embodiment, Inter-element Move Class instructions, shuffle (VSHFL) and unshuffle (VUNSHFL) fall into this category. FIG. 4A illustrates the shuffle operation for a 64-byte data width, with source registers VRb 400 and VRa 410 and destination registers VRd 420 and VRc 430. VSHFL places the first element of register VRb 400 into the first location of register VRd 420, the first element of register VRa 410 into the second location of VRd 420 as illustrated by the arrows in FIG. 4A. Assuming elements are bytes, the first 32 bytes of VRb 400 and VRa 410 are alternately placed in 64-byte wide VRd 420. The remaining 32 bytes of VRb 400 and VRa 410 are then alternately places in 64-byte wide register VRc 430.

Figure 4B:
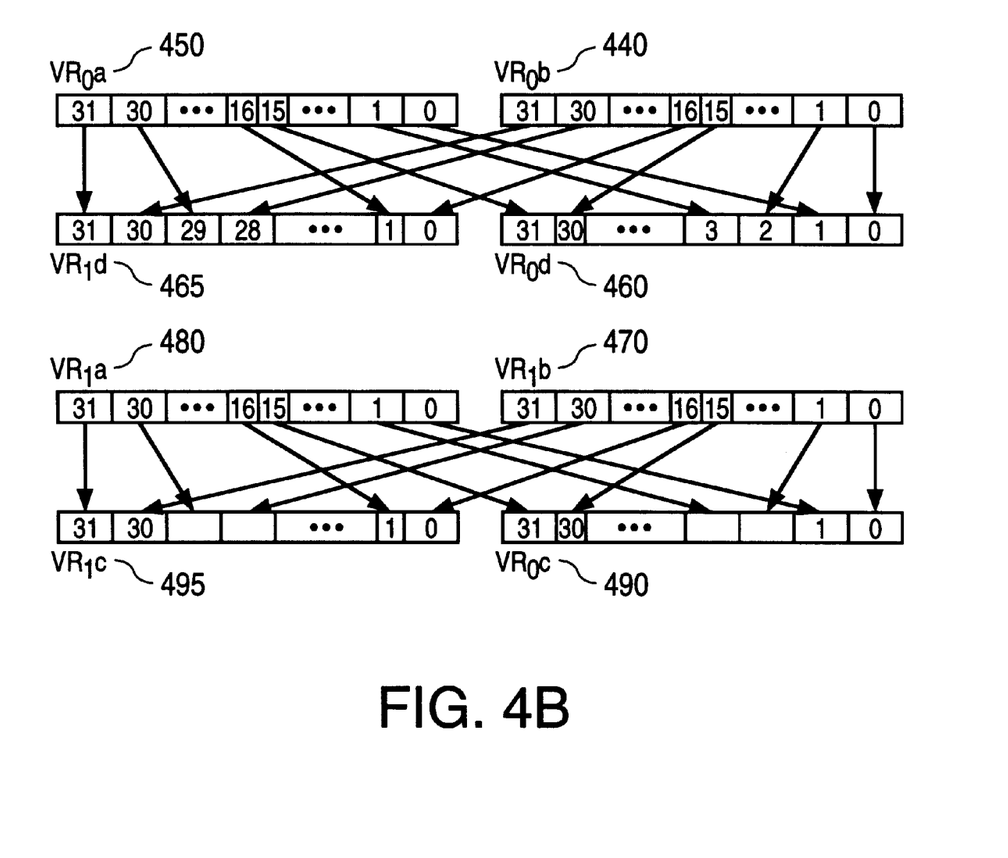
FIG. 4B is a diagram of a 64-byte shuffle operation emulated with 32-byte shuffle operations.

FIG. 4B shows the 64-byte shuffle operation emulated with two 32-byte shuffle operations. Because of the symmetry of defined shuffle operation, a 32-byte shuffle operation is first executed to shuffle the first 16-bytes of VR$_0$b 440 and VR$_0$a 450 into 32-byte register VR$_0$d 460 and the second 16-bytes of VR$_0$b 440 and VR$_0$a 450 into 32-byte register VR$_1$d 465. The results are then stored back in the register file or in an accumulator. A second 32-byte shuffle operation is then executed to shuffle the third 16-bytes of VR$_1$b 470 and VR$_1$a 480 into 32-byte register VR$_0$c 490 and the fourth 16-bytes of VR$_1$b 470 and VR$_1$a 480 into 32-byte register VR$_1$c 495, which are then stored, resulting in a 64-byte shuffle operation. In assembler syntax notation, 64-byte VSHFL VRc, VRd, VRa, VRb is emulated by 32-byte VSHFL VR$_1$d, VR$_0$d, VR$_0$a, VR$_0$b 32-byte VSHFL VR$_1$c, VR$_0$c, VR$_1$a, VR$_1$b, where a and b denote source registers and c and d denote destination registers. The second shuffle instruction can be pipelined such that the second shuffle operation is performed while the result of the first shuffle operation is being stored. Furthermore, because the 64-byte shuffle operation is symmetric, as shown in FIG. 4A, the order of execution for the two 32-byte shuffle instructions has no effect. The 64-byte operation is independent between 32-byte registers, i.e., the result of a 64-byte shuffle does not depend on the relationship between elements at locations 31 and 32 of a 64-byte register, and thus can be emulated with two 32-byte operations. The unshuffle instruction undoes the shuffle operation and is likewise symmetric.

Some instructions identify specific locations of elements in a vector register. For 32-byte operation, a 5-bit field is needed to specify any of 32 element locations. For 64-byte operation, a sixth bit is needed in order to specify any of 64 element locations in the vector register. In the exemplary embodiment of the invention, the Register Move Class instructions, insert (VINSRT) and extract (VEXTRT) require specific element locations. For the insert instruction, the element in scalar register SRa is inserted into vector register VRd at a location specified by scalar register SRb or immediate field IMM. Similarly for the extract instruction, an element from vector register VRa at a location specified by scalar register SRb or IMM field is extracted and stored into scalar register SRd. The 32-bit scalar registers can easily accommodate 5-bit or 6-bit indices to identify data elements. However, in the IMM field of an instruction, the additional bit can be located within the instruction at unused reserved bit locations. In 64-byte mode, the element location index ranges from 0 to 63. For the VINSRT operation, the destination vector register VRd is VR$_0$d if the index is from 0 to 31. If the index is from 32 to 63, the index is adjusted down by 32 and the destination register is VR$_1$d. For the VEXTRT operation, the source vector register VRa is VR$_0$a if the index is from 0 to 31 and VR$_1$a if the index is from 32 to 63, with the index adjusted down by 32.

Some instructions shift all elements by one position to produce one scalar result (the element shifted out) and one vector result (the rest of the original elements plus an element shifted in from a scalar register). A 64-byte shift operation can be emulated by executing two 32-byte shift operations, with the destination scalar register used twice, once to hold the temporary result of the first 32-byte shift and then to hold the final result after the second 32-byte shift.

Figure 5:
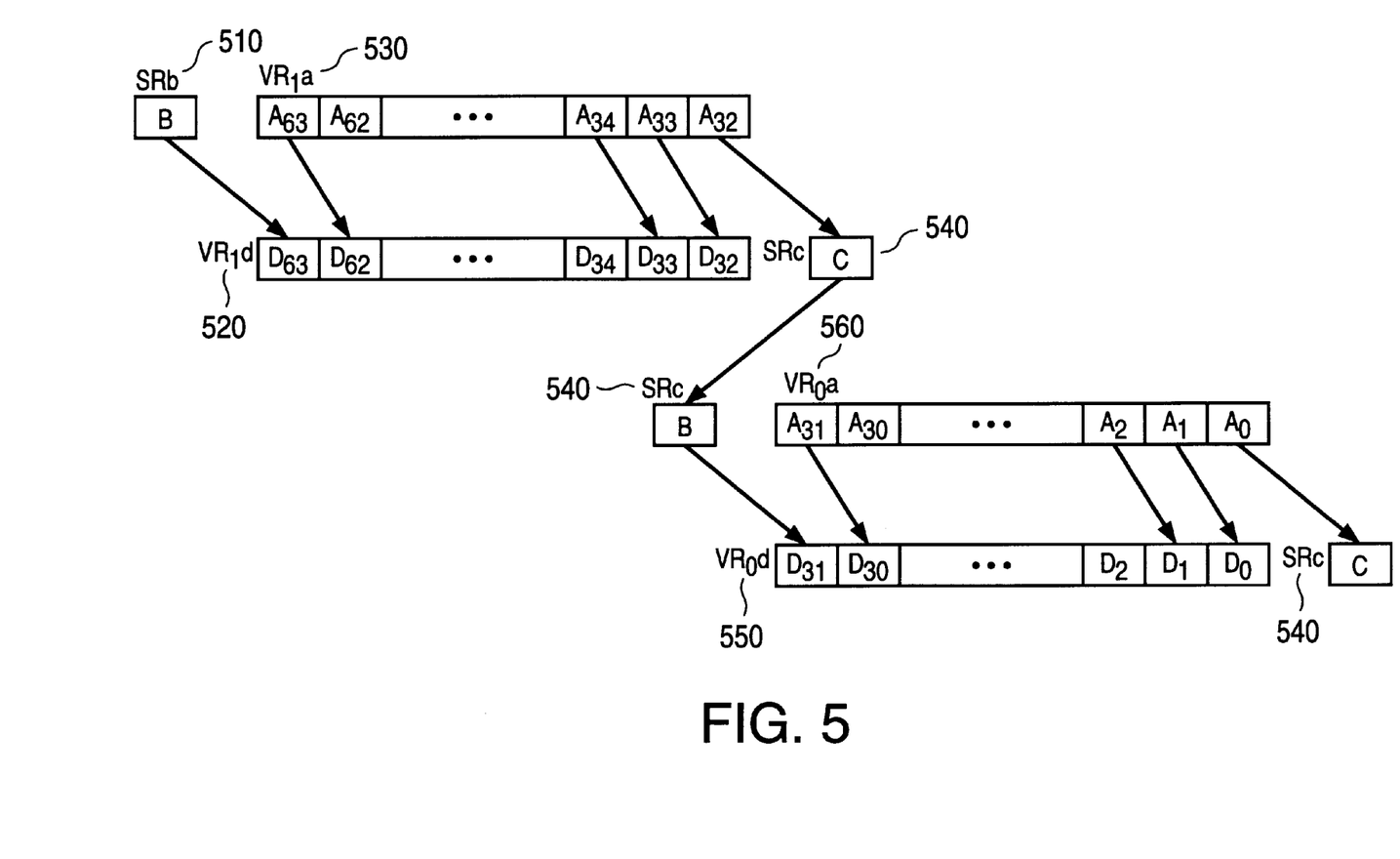
FIG. 5 is a diagram of a 64-byte shift right operation emulated with 32-byte shift right operations.

FIG. 5 illustrates the two-step emulation for Inter-element Move Class instruction, shift right (VESR) of the exemplary vector processor. In the first 32-byte shift operation, element or byte B in scalar register SRb 510 is shifted into element location 31 of vector register VR$_1$d 520, and the elements of vector register VR$_1$a 530 are shifted into the remaining locations of VR$_1$d 520 with element A$_{32}$ in location 0 of VR$_1$a shifted into scalar register SRc 540. In the second 32-byte shift operation, the element A$_{32}$ in SRc is shifted into element location 31 of vector register VR$_0$d 550, and the elements of vector register VR$_0$a 560 are shifted into the remaining locations of VR$_0$d 550 with element A$_0$ in location 0 of $VR_0a$ shifted into scalar register SRc 540 to complete a 64-byte shift operation. In assembler syntax notation,     64-byte VESR SRc, VRd, VRa, SRb is emulated as
    32-byte VESR SRc, $VR_1d$, $VR_1a$, SRb
    32-byte VESR SRc, $VR_cd$, $VR_0a$, SRc.

A similar method is used to emulate a 64-byte shift left (VESL) operation using two 32-byte shift left operations.

Instructions that require an operation on two adjacent elements in a vector register can be equivalently defined to operate on a successive odd/even pair or eve/odd pair to emulate 64-byte operations with two 32-byte instructions. In the exemplary embodiment of the present invention, the following Inter-element Arithmetic Class instructions fall into this category: add two adjacent elements (VADDH); average two adjacent elements (VAVGH); and compare adjacent elements and move the maximum element into the even location and lesser element into the odd location (VMAXE).

Figure 6:
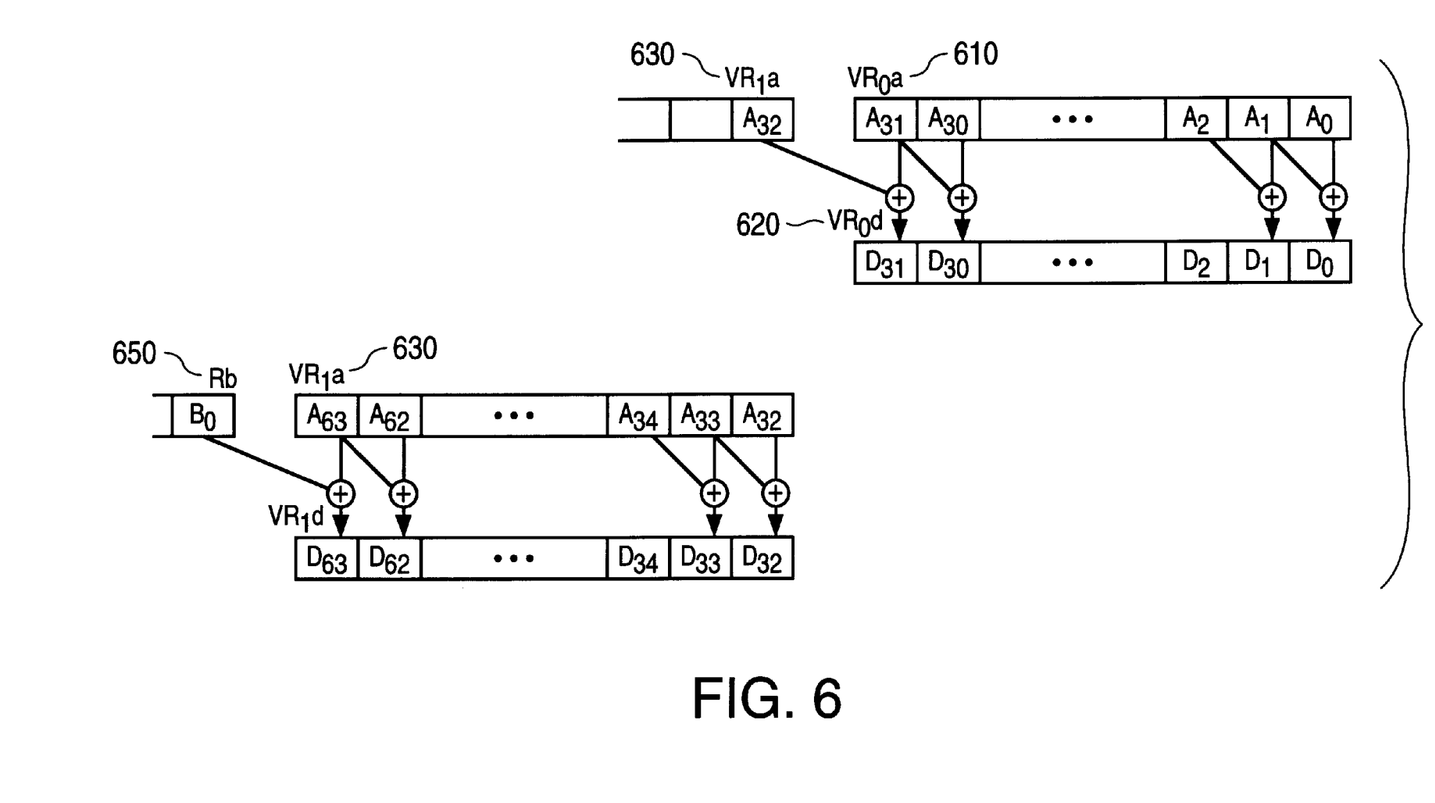
FIG. 6 is a diagram of a 64-byte operation to add adjacent elements emulated with 32-byte operations.

FIG. 6 illustrates how adding adjacent elements from 64-byte data can be emulated with two 32-byte VADDH operations. In the first 32-byte VADDH operation, adjacent even and odd elements in vector register $VR_0a$ 610 are added together and stored in the first 31 positions of vector register $VR_0d$ 620. The last position in $VR_0d$ is filled with the sum of the last element $A_{31}$ (odd) of $VR_0a$ and the first element $A_{32}$ (even) of $VR_1a$ 630. In the second 32-byte VADDH operation, adjacent even and odd elements in $VR_1a$ 630 are added together and stored in the first 31 positions of vector register $VR_1d$ 640. The last position of $VR_1d$ is filed with the sum of the last element $A_{63}$ (odd) of $VR_1a$ 630 and the first element $B_0$ (even) of register Rb 650, resulting in a 64-byte VADDH operation. (Register Rb can be either a vector register or a scalar register.) In assembler syntax notation,     64-byte VADDH, VRd, VRa, VRb (SRb) is emulated with
    32-byte VADDH $VR_0d$, $VR_0a$, $VR_1a$
    32-byte VADDH $VR_1d$, $VR_1a$, VRb (SRb).

The 64-byte VAVGH operation is emulated in the same way, where only the type of operation differs, i.e., averaging elements instead of adding elements.

Figure 7:
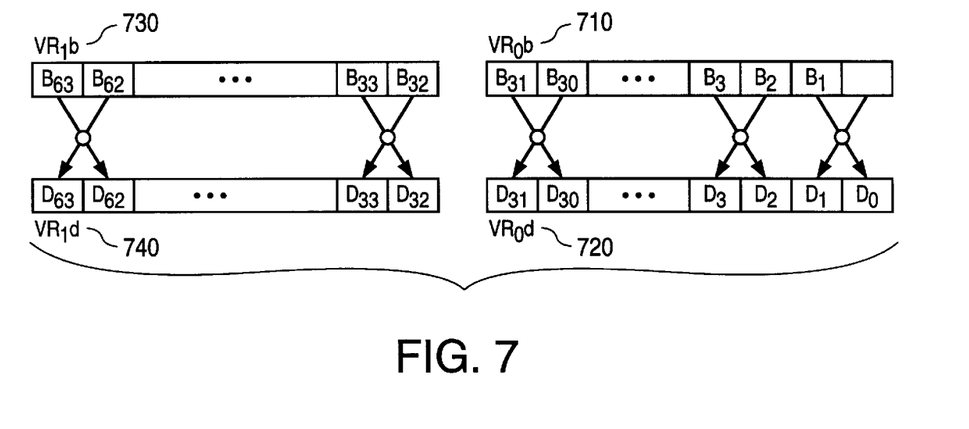
FIG. 7 is a diagram of a 64-byte operation to compare and exchange elements emulated with 32-byte operations.

FIG. 7 shows a 64-byte VMAXE operation emulated with two 32-byte VMAXE operations. In the first 32-byte VMAXE operation, sixteen even/odd data element pairs are compared in $VR_0b$ 710. The greater of the two is stored in the even numbered location of $VR_0d$ 720 and the lesser stored in the odd numbered location of $VR_0d$. In the second 32-byte VMAXE operation, the next sixteen even/odd data element pairs, in $VR_1b$ 730, are compared, with the greater of the two stored in the even numbered location of $VR_1d$ 740 and the lesser in the odd numbered location. $VR_1d$ 740 and $VR_0d$ 720 are combined as discussed previously to provide the 64-byte result of a 64-byte VMAXE operation. In assembler syntax notation,     64-byte VMAXE VRd, VRb is emulated with
    32-byte VMAXE $VR_1d$, $VR_1b$
    32-byte VMAXE $VR_0d$, $VR_0b$.

Some instructions load and store contents of a vector register into another register. 64-byte instructions of this type can be emulated with 32-byte architectures by executing two 32-byte instructions, where the effective address (EA) for the second 32-byte instruction is adjusted to load or store elements at byte locations 32 through 63. Thus, if EA+i (i=0 to 31) is the effective address for the first 32-byte operation, the effective address for the second 32-byte operation is EA=EA+32+i (i=0 to 31) to emulate a 64-byte operation. Therefore, emulator 130 adjusts the effective address for the second 32-byte load and store operations by 32.

Other types of vector processor instructions can be modified similarly to allow emulation of 2N-byte wide instructions with two N-byte wide instructions.

Returning to FIG. 1, for a 64-byte operation, the instruction issuer within emulator 130 holds two 32-byte instructions in a pipeline. The first 32-byte instruction initiates a write stage to access the data from the desired registers in bank0 of register file 140. Execution unit 150 then operates on the data and stores the result in accumulator 160 or back into bank0 of register file 140. While the first 32-bytes are being processed, instruction issuer initiates the write stage for the second 32-byte instruction to access data in desired registers in bank1. The data is processed by execution unit 150, and the result is stored in accumulator 160 or back into bank1 of register file 140. Thus, a 64-byte operation is emulated with two 32-byte operations using 32-byte architecture. Because 32-byte instructions and architecture are used for 64-byte operations, the size and coasts of the chip, as well as the code length or density, are reduced when compared to vector processors utilizing 64-byte instructions and architecture.

The following section provides additional details regarding the vector processor, such as register types and formats and instruction sets, fields, and formats.

Additional Vector Processor Information

Part A

There are 33 special-purpose registers that cannot be loaded directly from memory or stored directly to memory. Sixteen special-purpose registers, referred to as RASR0 to RASR15, form an internal return address stack for subroutine call and return instructions. Seventeen more 32-bit special-purpose registers are shown in Table A.1.

TABLE A.1

Special-purpose registers

| Number | Mnemonic | Description |
| --- | --- | --- |
| SP0 | VCSR | Vector Control and Status Register |
| SP1 | VPC | Vector Program Counter |
| SP2 | VEPC | Vector Exception Program Counter |
| SP3 | VISRC | Vector Interrupt Source Register |
| SP4 | VIINS | Vector Interrupt Instruction Register |
| SP5 | VCR1 | Vector Count Register 1 |
| SP6 | VCR2 | Vector Count Register 2 |
| SP7 | VCR3 | Vector Count Register 3 |
| SP8 | VGMR0 | Vector Global Mask Register 0 |
| SP9 | VGMR1 | Vector Global Mask Register 1 |
| SP10 | VOR0 | Vector Overflow Register 0 |
| SP11 | VOR1 | Vector Overflow Register 1 |
| SP12 | VIABR | Vector Instruction Address Breakpoint Reg. |
| SP13 | VDABR | Vector Data Address Breakpoint Register |
| SP14 | VMMR0 | Vector Move Mask Register 0 |
| SP15 | VMMR1 | Vector Move Mask Register 1 |
| SP16 | VASYNC | Vector & ARM7 Synchronization Register |

Vector control and status register VCSR definition is shown in Table A.2.

TABLE A.2

VCSR definition

| Bit | Mnemonic | Description |
| --- | --- | --- |
| 31:18 | reserved | |
| 17:13 | VSP<4:0> | Return address stack pointer. VSP is used by the jump to subroutine and return from subroutine instructions to keep track of the top of the internal return address stack. |

TABLE A.2-continued

VCSR definition

| Bit | Mnemonic | Description |
|---|---|---|
| | | There are only 16 entries in the return address stack - VSP<4> is used for detecting stack overflow condition. |
| 12 | SO | The summary overflow status flag. This bit is set when an arithmetic operation results in overflow. This bit is sticky - once set, it remains set until cleared by writing 0 to this bit. |
| 11 | GT | The greater than status flag. This bit gets set by the VSUBS instruction when SRa > SRb. |
| 10 | EQ | The equal status flag. This bit gets set by the VSUBS instruction when SRa = SRb. |
| 9 | LT | The less than status flag. This bit gets set by the VSUBS instruction when SRa < SRb. |
| 8 | SMM | Select Move Mask. When this bit is set, the VMMR0/1 pair becomes the element mask for the arithmetic operations. |
| 7 | CEM | Complement Element Mask. When this bit is set, the element mask is defined to be one's complement of the VGMR0/1 or VMMR0/1, whichever is configured to be the element mask for arithmetic operation. This bit does not change the contents of the VGMR0/1 or VMMR0/1 - it only changes the use of these registers. The SMM:CEM encodings specify: 00 - use VGMR0/1 as the element mask for all but VCMOVM 01 - use -VGMR0/1 as the element mask for all but VCMOVM 10 - use VMMR0/1 as the element mask for all but VCMOVM 11 - use -VMMR0/1 as the element mask for all but VCMOVM |
| 6 | OED | Overflow Exception Disable. When this bit is set, processor 120 continues with execution upon detecting an overflow condition. |
| 5 | ISAT | Integer saturation mode. The combination of OED:ISAT bits specify: 00 - no saturation, report when overflow exception occurs x1 - saturation, cannot cause overflow 10 - no saturation, do not report when overflow exception occurs |
| 4:3 | RMODE | Rounding mode for IEEE 754 floating point operations. 00 round toward -infinity 01 round toward zero 10 round toward nearest 11 round toward +infinity |
| 2 | FSAT | Floating point saturation (fast IEEE mode) mode bit |
| 1 | CBANK | Current Bank bit. When set indicates that bank 1 is the current bank. When clear indicates that bank 0 is the current bank. CBANK is ignored when the VEC64 bit is set. |
| 0 | VEC64 | 64 byte vector mode bit. When set specifies that the vector registers and accumulators are to have 512 bits. The default mode specifies 32 of byte size, referred to as the VEC32 mode. |

Part B

The following describes a subset of an instruction set for an exemplary embodiment of a vector processor in accordance with an embodiment of the invention. Further description of the instruction set for the exemplary embodiment of the vector processor can be found in co-owned U.S. patent app. Ser. No. 08/699,597, entitled "Single-Instruction-Multiple-Data Processing in a Multimedia Signal Processor", which is incorporated by reference above.

The control flow class includes instructions that control the program flow. It has the branch and ARM7 interface instructions.

TABLE B.1

Control flow class

| Mnemonic | Description |
|---|---|
| VCBR | Branch if condition is true |
| VCBRI | Branch indirect if condition is true |
| VD1CBR | Decrement VCR1 and branch if condition is true |
| VD2CBR | Decrement VCR2 and branch if condition is true |
| VD3CBR | Decrement VCR3 and branch if condition is true |
| VCJSR | Jump to subroutine if condition is true |
| VCJSRI | Jump indirect to subroutine if condition is true |
| VCRSR | Return from subroutine if condition is true |
| VCINT | If condition is true, halt execution and interrupt ARM7, if enabled |
| VCJOIN | If condition is true, halt execution and interrupt ARM7, if enabled |
| VCCS | Jump to context switch subroutine if VIMSK<cse> is true |
| VCBARR | Stall the instruction and all later instructions as long as condition holds |
| VCHGCR | Changes operation mode of the vector processor |

The logical class includes the bit-wise logical instructions, supporting the Boolean data types and requiring the data type. Table B.2 lists the logical class instructions.

TABLE B.2

Logic Instructions

| Mnemonic | Description |
|---|---|
| VNOT | Logically NOT - -B |
| VAND | Logically AND Ra and Rb - (A & B) |
| VCAND | Logically AND complement of Ra and Rb - (-A & B) |
| VANDC | Logically AND Ra and complement Rb - (A & -B) |
| VNAND | Logically NAND each bit of each element in Ra with corresponding bit of Rb - -(A & B) |
| VOR | Logically OR each bit of each element in Ra with corresponding bit of Rb - (A ' B) |
| VCOR | Logically OR complement of Ra and Rb - (-A ' B) |
| VORC | Logically OR each bit of each element in Ra with complement of corresponding bit in Rb - (A ' -B) |
| VNOR | Logically NOR each bit of each element in Ra with corresponding bit in Rb - -(A $^a$ B) |
| VXOR | Logically Exclusive OR Ra with Rb - (A $\char`\^$ B) |
| VXNOR | Logically Exclusive NOR Ra with Rb - -(A $\char`\^$ B) |

The shift and rotate class includes instructions that shift and rotate the bits within each element. The shift/rotate class instructions operate on the 8-bit, 16-bit and 32-bit integer data types and require the data type. Table B.3 lists the shift/rotate class instructions.

TABLE B.3

Shift & Rotate class

| Mnemonic | Description |
|---|---|
| VDIV2N | Ra divided by $2^n$ |
| VLSL | Each element of Ra is shifted left by amount in Rb |
| VLSR | Each element of Ra is shifted right by amount in Rb |
| VROL | Each element in Ra is rotated left by amount in Rb |
| VROR | Each element in Ra is rotated right by amount in Rb |

The arithmetic class includes the element-wise arithmetic instructions, i.e. the result of the ith element is computed from the ith elements of the sources. The instructions are listed in Table B.4, and in general, support eh 8-bit, 16-bit, 32-bit integer and 32-bit floating point data types.

TABLE B.4

Arithmetic Class

| Mnemonic | Description |
| --- | --- |
| VASR | Each data element of Ra is right shifted by amount given in LSB of Rb |
| VADD | Add Ra and Rb |
| VAVG | Average Ra and Rb |
| VSUB | Subtract Rb from Ra |
| VASUB | Absolute of Rb subtracted from Ra |
| VMUL | Multiply each element of Ra with each element of Rb for double precision result |
| VMULA | Multiply each element of Ra and Rb and write result to accumulator |
| VMULAF | Multiply each element of Ra and Rb, left shift result one bit and write accumulator |
| VMULF | Multiply each element of Ra and Rb, left shift result one bit and store upper half in Rd + 1 and lower half in Rd |
| VMULFR | Multiply each element of Ra and Rb, left shift result one bit and round upper half |
| VMULL | Multiply each element of Ra and Rb and store lower portion in Rd |
| VMAD | Multiply each element of Ra and Rb and add to each element of Rc |
| VMADL | Multiply each element of Ra and Rb, add to each element of Rc, and store lower portion |
| VADAC | Add each element of Ra and Rb with elements in accumulator |
| VADACL | Add each element of Ra and Rb with elements in accumulator, store result in accumulator, and store lower portion in Rd |
| VMAC | Multiply each element of Ra and Rb and add with elements in accumulator |
| VMACF | Multiply each element of Ra and Rb, left shift result one bit, add result to elements in accumulator |
| VMACL | Multiply each element of Ra and Rb, add with elements of accumulator, store lower half in Rd |
| VMAS | Multiply each element of Ra and Rb and subtract from elements in accumulator |
| VMASF | Multiply each element of Ra and Rb, left shift result one bit, subtract result from elements in accumulator |
| VMASL | Multiply each element of Ra and Rb, subtract result from accumulator, and store lower half in Rd |
| VSATU | Each element of Ra is checked against its corresponding upper limit in Rb, and set to upper limit if greater than upper limit |
| VSATL | Each element of Ra is checked against its corresponding lower limit in Rb, and set to lower limit if less than lower limit |
| VSUBS | Subtract SRb from SRa, store in SRd, and set VFLAG bits in VCSR |
| VCMPV | Compare elements in Ra and Rb, and set VGMR or VMMR masks accordingly |
| VDIVI | Perform the initial step of a non-restoring signed integer division |
| VDIVS | Perform one iterative step of a non-restoring signed division |
| VASL | Left shift each element of Ra by amount in Rb |
| VASA | Left or right shift each element in accumulator by one bit |

Table B.5 list the MPEG instructions, which are instructions that are optimized for multimedia applications. The MPEG instructions support the 8-bit, 16-bit, 32-bit integer data types and requires data type.

TABLE B.5

MPEG class

| Mnemonic | Description |
| --- | --- |
| VAAS3 | Add Ra to Rb and add result with sign of Ra |
| VASS3 | Add Ra to Rb and subtract sign of Ra with result |
| VEXTSGN2 | Sign value (1, −1) of each element of Ra computed and stored in Rd |
| VEXTSGN3 | Sign value (1, 0, −1) of each element of Ra computed and stored in Rd |
| VXORALL | XOR LSB of each element of VRb and stored in LSB of SRd |

TABLE B.5-continued

MPEG class

| Mnemonic | Description |
| --- | --- |

Table B.6 lists the data type conversion instructions for converting elements from one data type to another. Each data type conversion instruction supports specific data types. The architecture does not support more than one data type in a register.

TABLE B.6

Data Type Conversion Class

| Mnemonic | Description |
| --- | --- |
| VCVTIF | Convert elements in Rb from int32 to float |
| VCVTFF | Convert elements in Rb from float to fixed point |
| VROUND | Round floating point elements in Rb to int32 |
| VCNTLZ | Count leading zeroes for each element in Rb |

Table B.7 lists the inter-element arithmetic class of instructions, which take two elements from different positions of the vectors to produce arithmetic results. The inter-element arithmetic class support the 8-bit, 16-bit, 32-bit integer and 32-bit floating point data types.

TABLE B.7

Inter-element Arithmetic Class

| Mnemonic | Description |
| --- | --- |
| VADDH | Add every two adjacent elements in Ra |
| VAVGH | Average every two adjacent elements in Ra |
| VADDQ | Add every two adjacent elements in Ra and Rb |
| VAVGQ | Average every two adjacent elements in Ra and Rb (not supported by VEC64) |
| VMAXE | Compare each even/odd element of Rb and store greater in even location and lesser in odd location of Rd |

Table B.8 lists the inter-element move class instructions, which take two elements from different positions of the vectors to rearrange the elements. The inter-element move class of instructions support the 8-bit, 16-bit, 32-bit integer and 32-bit floating point data types.

TABLE B.8

Inter-element Move Class

| Mnemonic | Description |
| --- | --- |
| VESL | Shift left elements in Ra by one |
| VESR | Shift right elements in Ra by one |
| VSHFL | Shuffle contents of Ra with Rb |
| VSHFLM | Shuffle contents of Ra with Rb and store upper half in Rd |
| VSHFLL | Shuffle contents of Ra with Rb and store lower half in Rd |
| VUNSHFL | Unshuffle contents from Ra and Rb |
| VUNSHFLH | Unshuffle contents from Ra and Rb and store upper half in Rd |
| VUNSHFLL | Unshuffle contents from Ra and Rb and store lower half in Rd |

Table B.9 lists the load and store class of instructions, which load or store registers. The load and store class supports the 8-bit, 16-bit, 32-bit integer and 32-bit floating point data types.

TABLE B.9

Load & store class

| Mnemonic | Description |
|---|---|
| VL | Load a vector register into the current or alternate bank or a scalar register |
| VLD | Load two vector registers into the current or alternate bank or two scalar registers |
| VLQ | Load four vector registers into the current or alternative bank or four scalar registers |
| VLCB | Load a vector or scalar register from the circular buffer |
| VLR | Load a vector register in reverse element order |
| VLWS | Load 32 bytes from memory to Rd using SRb |
| VST | Store a vector or scalar register |
| VSTD | Store two vector registers from the current or alternate bank or two scalar registers |
| VSTQ | Store four vector registers from the current or alternate bank or four scalar registers |
| VSTCB | Store a vector or scalar register from the circular buffer |
| VSTR | Store a vector register in reverse element order |
| VSTWS | Store 32 bytes from memory to Rd using SRb |

Table B.10 lists the register move class instructions, which transfer between two registers. The register move class of instructions support the 8-bit, 16-bit, 32-bit integer and 32-bit floating point data types.

TABLE B.10

Register move class

| Mnemonic | Description |
|---|---|
| VLI | Load an immediate value into a scalar or vector register |
| VMOV | Move contents of Rb to Rd (not used for VEC64) |
| VCMOV | Move contents of Rb to Rd if Cond true |
| VCMOVM | Move contents of Rb to Rd if Cond true with element mask |
| VEXTRT | Extract an element from Ra whose index is specified by Rb and store in Rd |
| VINSRT | Insert an element from Ra into Rd at index specified by Rb |

Part C

Figure 3:
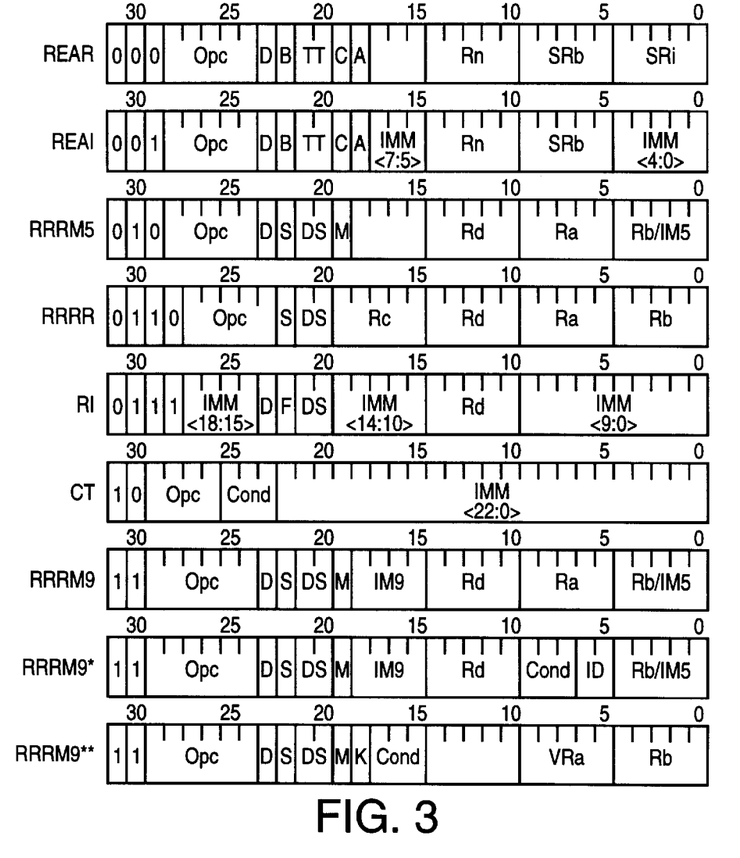
FIG. 3 is a diagram of various instruction formats for the vector processor.

Table C.1 provides descriptions of the various fields in the instruction formats of FIG. 3.

TABLE C.1

Instruction format fields

| Field | Description |
|---|---|
| Opc | Opcode |
| B | Bank identifier for the Rn register. When set in VEC32 mode, Rn<4:0> denotes a vector register number in the alternate bank. When set in VEC64 mode, denotes a full vector (64-byte) operation. |
| D | Destination/source register. When set, destination register is a scalar register; when clear, it is a vector register |
| DB | legal values for B:D encodings in VEC32 mode are:<br>00 Rn is a vector register in current bank<br>01 Rn is a scalar register in current bank<br>10 Rn is a vector register in alternate bank<br>11 undefined<br>The legal values for B:D encodings in VEC64 mode are:<br>00 Only 4, 8, 16 or 32 bytes of vector register Rn is used |

TABLE C.1-continued

Instruction format fields

| Field | Description |
|---|---|
| | 01 Rn is a scalar register<br>10 All 64 bytes of vector register Rn is used<br>11 undefined |
| TT | Transfer Type indicates a specific load or store operation. |
| C | Cache off. Set to bypass data cache for load |
| A | Address update. Set to update SRb with the effective address. |
| Rn | Destination/source register number |
| SRb | Scalar base register number |
| SRi | Scalar index register number |
| IMM | Immediate offset, interpreted as 2's complement number |
| S | Scalar Rb register. When set, indicates Rb<4:0> is a scalar register; when clear, it is a vector register |
| DS | Data size. The encodings are:<br>00 byte (used by int8 data type)<br>01 byte9 (used by int9 data type)<br>10 halfword (used by int16 data type)<br>11 word (used by int32 or float data type) |
| M | Modifier for D:S bits. |
| Rd | Destination D register number |
| Ra | Source A register number |
| Rb | Source B register number |
| Rc | Source/destination C register number |
| F | Float data type. When set, denotes floating point data type and requires DS to be 11 |
| Cond | Branch condition:<br>000 always<br>001 less than<br>010 equal<br>011 less than or equal<br>100 greater than<br>101 not equal<br>110 greater than or equal<br>111 overflow |

The following description of instruction formats provides more details to some of the field designations.

The load and store instructions which use scalar registers when determining an effective address have the REAR format. REAR-format instructions have three operands identified by two register numbers SRb and SRi for scalar registers and by one register number Rn which may be a scalar or vector register depending on a bit D. A bank bit B either identifies a bank for register Rn or indicates whether vector register Rn is a double-size vector register if the default vector register size is double-size. An op-code field Opc identifies the operation performed on the operands, and a field TT indicates a transfer type as load or store. A typical REAR-format instruction is instruction VL which loads register Rn from an address determined by adding the contents of scalar registers SRb and SRi. If bit A is set, the calculated address is stored in scalar register SRb.

REAI-format instructions are the same as REAR instructions except that an 8-bit immediate value from field IMM is used in place of the contents of scalar register SRi. REAR and REAI formats do not have a data element size field.

The RRRM5 format is used mostly by the multimedia instructions, which include the shift, rotate, element shift, vector/scalar conversion, multimedia, data type conversion, inter-element, and register move classes, which have two source operands and one destination operand. These instructions have either three register operands or two register operands and a 5-bit immediate value. An encoding of fields D, S, and M as shown in xx determines whether the first source operand Ra is a scalar or vector register; whether the second source operand Rb/IM5 is a scalar register, a vector register, or a 5-bit immediate value; and whether the destination register Rd is a scalar or vector register.

The RRRR format is for instructions having four register operands. Register numbers Ra and Rb indicated source registers. Register number Rd indicates a destination register, and register number Rc indicates either a source or a destination register depending on field Opc. All of the operands are vector registers unless bit S is set to indicate register Rb is a scalar register. Field DS indicates the data element size for the vector registers. Field Opc selects the data type for 32-bit data elements.

An RI-format instruction is used only for the load immediate instruction. Field IMM contains an immediate value of up to 18 bits. Register number Rd indicates the destination register which is either a vector register in the current bank or a scalar register depending on bit D. Fields DS and F respectively indicate a data element size and type. For 32-bit integer data elements, the 18-bit immediate value is sign extended before being loaded into register Rd. For floating point data elements, bit 18, bits 17 to 10, and bits 9 to 0 respectively indicate the sign, exponent, and mantissa of a 32-bit floating point value.

The CT format is for flow control instructions and includes an op-code field Opc, a condition field Cond, and a 23-bit immediate value IMM. A branch is taken when a condition indicated by the condition field is true. Possible condition codes are "always", "less than", "equal", "less than or equal", "greater than", "not equal", "greater than or equal", and "overflow". Bits GT, EQ, LT, and SO in status and control register VCSR are used to evaluate the conditions.

The RRRM9 format is used mostly by the arithmetic and logical instructions, and provides for either three register operands or two register operands and a 9-bit immediate value. A combination of bit D, S, and M indicate which of operands are vector registers, scalar registers, or 9-bit immediate values. Field DS indicates a data element size. The RRRM9+ and RRRM9++ formats are special cases of the RRRM9 format and distinguished by opcode field Opc. The RRRM9+ format replaces a source register number Ra with a condition code Cond and an ID field. The RRRM9++ format replaces most significant bits of the immediate value with a condition code Cond and a bit K.

Part D

Table D.1 shows the opcode assignments for the REAR and REAI instruction formats.

TABLE D.1

| | REAR and REAI encoding | | | |
|---|---|---|---|---|
| Opc <4:3> | Opc<2:0>= 000 | Opc<2:0>= 010 | Opc<2:0>= 100 | Opc<2:0>= 110 |
| 00 | VL | VLD | VLQ | VPFTCH |
| 01 | VLR | VLCB | VLWS | VCACHE |
| 10 | VST | VSTD | VSTQ | VWBACK |
| 11 | VSTR | VSTCB | VSTWS | |

Table D.2 shows the opcode assignments for the RRRM5 instruction format.

TABLE D.2

| | RRRM5 encoding | | | |
|---|---|---|---|---|
| Opc <4:2> | Opc<1:0>= 00 | Opc<1:0>= 01 | Opc<1:0>= 10 | Opc<1:0>= 11 |
| 000 | VLSR | VLSL | VROR | VROL |
| 001 | VASR | VASL | VDIV2N | VDIV2N.f |

TABLE D.2-continued

| | RRRM5 encoding | | | |
|---|---|---|---|---|
| Opc <4:2> | Opc<1:0>= 00 | Opc<1:0>= 01 | Opc<1:0>= 10 | Opc<1:0>= 11 |
| 010 | | | | VCVTFF |
| 011 | | | | |
| 100 | VASS3 | VAAS3 | | VCVTIF |
| 101 | VADDH | VAVGH | | VAVGQ |
| 110 | VMAXE | VAVG | VROUND | |
| 111 | | | | |

Table D.3 shows the opcode assignments for the RRRR instruction format.

TABLE D.3

| | RRRR encoding | | | |
|---|---|---|---|---|
| Opc <4:2> | Opc<1:0>= 00 | Opc<1:0>= 01 | Opc<1:0>= 10 | Opc<1:0>= 11 |
| 000 | VSHFL | VUNSHFL | | |
| 001 | | | VESR | VESL |
| 010 | VMUL | VMADL | | VMAD |
| 011 | VADAC | | | |
| 100 | VSHFLH | VUNSHFLH | VSHFLL | VUNSHFLL |
| 101 | VCNTLZ | | VEXTSGN2 | VEXTSGN3 |
| 110 | VMOV | VASA | VDIVI | VDIVS |
| 111 | VXORALL | | VCVTB9 | |

Table D.4 shows the opcode assignments for the CT instruction format.

TABLE D.4

| | CT encoding | | | |
|---|---|---|---|---|
| Opc <3:2> | Opc<1:0>= 00 | Opc<1:0>= 10 | Opc<1:0>= 10 | Opc<1:0>= 11 |
| 00 | VCBR | VD1CBR | VD2CBR | VD3CBR |
| 01 | VCJSR | VCRSR | VCJOIN | VCINT |
| 10 | VCBRI | VCHGCR | VCBARR | |
| 11 | VCJSRI | VCCS | | |

Table D.5 shows the opcode assignments for the RRRM9 instruction format.

TABLE D.5

| | RRRM9 encoding | | | |
|---|---|---|---|---|
| Opc <5:2> | Opc<1:0>= 00 | Opc<1:0>= 01 | Opc<1:0>= 10 | Opc<1:0>= 11 |
| 0000 | VADD | | VMULA | VADACL |
| 0001 | VSUB | | VMULAF | |
| 0010 | VASUB | | VMACF | VMACL |
| 0011 | VSATU | VSATL | VMASF | VMASL |
| 0100 | VCMOV | VCMOVM | | |
| 0101 | VMULF | VMULL | VCMPV | VSUBS |
| 0110 | VAND | VNOR | | VOR |
| 0111 | VNAND | VXNOR | | VXOR |
| 1000 | VINSRT | VEXTRT | | |
| 1001 | | | | |
| 1010 | | | VMAC | |
| 1011 | | | VMAS | |
| 1100 | | | | |
| 1101 | VMULFR | | | |
| 1110 | VANDC | VNOT | | VORC |
| 1111 | VCAND | | | VCOR |

Although the invention has been described with reference to particular embodiments, the description is only an example of the invention's application and should not be taken as a limitation. For example, specific embodiments disclosed execute two single-width instructions to emulate one instruction for double the data width. Alternatively, three or more single-width instructions may be used to emulate instructions for triple or wider the data widths. Various other adaptations and combinations of features of the embodiments disclosed are within the scope of the invention as defined by the following claims.

We claim:

1. An N-data element vector processor unit for performing 2N-data element operations, comprising:
    an emulator coupled to an instruction unit for modifying N-data element instructions from said instruction unit for 2N-data element operation;
    a register file containing multiple N-data element registers, each of two said N-data element registers combined to form a 2N-data element register coupled to said emulator;
    a first set of N-bit special purpose scalar registers, wherein each bit in a pair of N-bit special purpose scalar registers from said first set represents one data element of the 2N data elements in a 2N-data element register;
    an N-data element execution unit for sequentially operating on data in said two N-data element registers coupled to said register file; and
    a multiple of 2N-data element accumulators, each of two said 2N-data element accumulators combined to form a 4N-data element accumulator coupled to said execution unit.

2. The vector processor of claim 1 further comprising a mode bit to indicate N-data element or 2N-data element operation.

3. The vector processor claim 1 further comprising a second set of N-bit special purpose scalar registers, wherein each bit in one of said N-bit special purpose scalar registers from said second set represents one data element of the N data elements in an N-data element register.

4. The vector processor of claim 1 further comprising an additional bit in said instructions to specify 2N data element locations.

5. The vector processor of claim 1 further comprising a bit in said N-data element instructions for specifying a first N-data element register or a second N-data element register.

6. The vector processor of claim 1, wherein said N-data element instructions operate on said data elements independent of a width of said data element registers.

7. The vector processor of claim 1, wherein said 2N-data element operations are symmetrical with respect to upper and lower halves of said 2N-data element operations.

8. The vector processor of claim 1, wherein said N-data element instructions operate on odd and even data elements.

9. A method of emulating 2N-data element operations using N-data element vector processor architecture, comprising:
    combining two N-data element registers to form one 2N-data element register;
    identifying each of 2N data elements in said 2N-data element register with a corresponding single bit from two N-bit special purpose scalar registers;
    modifying N-data element instructions to emulate 2N-data element instructions;
    executing an N-data element instruction on data in a first of said two N-data element registers; and
    executing an N-data element instruction on data in a second of said two N-data element registers.

10. The method of claim 9 further comprising the step of designating an N-data element operation or said 2N-data element operation with a mode bit.

11. The vector processor of claim 1, wherein said N-data element registers are 32-byte registers.

12. The vector processor of claim 1, further comprising an N-bit scalar register, wherein said N-bit scalar register temporarily holds one data element resulting from a first N-data element instruction and stores a data element resulting from a second N-data element instruction, wherein the first and second N-data element instructions combined correspond to a 2N-data element instruction.

13. The method of claim 9, further comprising temporarily holding one data element resulting from a first N-data element instruction and storing a data element resulting from a second N-data element instruction, wherein the first and second N-data element instructions combined correspond to a 2N-data element instruction.

* * * * *